2,801,914

EXOTHERMIC REACTION MIXTURE FOR PRODUCING A MOLTEN COPPER ALLOY

Donald J. Burke, Cleveland, Ohio, assignor to Erico Products, Inc., Cleveland, Ohio, a corporation of Ohio No Drawing. Application January 16, 1953, Serial No. 331,634

6 Claims. (Cl. 75—27)

This invention relates as indicated to a novel welding composition and method of welding, and more particularly cast welding, utilizing a metal-producing exothermic reaction mixture of the general type disclosed in Patent No. 2,229,045 to Charles A. Cadwell.

The welding material disclosed and claimed in such Cadwell patent has been very successfully employed in the cast welding of rail bonds to the sides of rails and for many other purposes. Such welding material comprises a mixture of copper oxide and a crushed copper aluminum alloy which when ignited will produce a charge of molten copper suitable for immediate use in the welding of a copper or copper alloy stranded conductor to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Patent No. 2,654,129 to Edward B. Neff teaches an improved form of cast welding apparatus adapted to be employed with the metal producing exothermic reaction mixture.

Because of the high temperature evolved by the exothermic reaction, it is feasible, under properly controlled conditions, to perform a cast welding operation utilizing but a very small charge of the molten metal. This renders it practical and economical to perform such operations as the welding of small signal bonds to the heads of steel rails and to weld stranded conductors to pipe lines, for example. When handling such small bodies of molten metal, however, there is obviously the problem of premature chilling before an adequate weld is obtained, and this is particularly important when electrical connections are to be made thereby. There must be a sufficient body of heat to achieve the weld. Small amounts of certain fluxing agents may be of assistance but for certain types of work, such as the welding together of two opposed cable ends, it has in the past been necessary to utilize a somewhat larger amount of weld metal than would be desirable, in order to ensure a connection which is both physically strong and of sufficient current-carrying capacity. Thus, when two opposed copper cable ends have been welded using the exothermic reaction material of Cadwell Patent 2,229,045, the weld metal will ordinarily form a cast weld connection of somewhat greater diameter than the cable itself and also extending along or sleeving the respective cable end portions to some extent. While quite satisfactory for many purposes, this type of weld obviously forms an unsightly bump or lump when wrapped with insulating tape or the like and may not be acceptable where the cable is to be repeatedly wound and unwound on a drum as in the case of certain electrically driven mine cars, for example.

It is accordingly a principal object of my invention to provide an improved metal producing exothermic reaction material having good electrical conductivity and high mechanical strength so that it may be employed in the formation of relatively small cast welds which will nevertheless have the requisite current-carrying capacity and mechanical strength to meet the conditions of use.

Another object is to provide such welding material capable of producing weld metal which will effectively wet the metal surfaces (e. g., copper and steel) with which it is brought in contact so as to form a strong and electrically conductive weld therewith.

Other objects of my invention will appear as the description proceeds.

To the accomplishment of the foregoing and related ends, said invention then consists of the means hereinafter fully described and particularly pointed out in the claims, the following description setting forth in detail certain approved compositions of matter and methods of employing the same, such disclosed composition and steps constituting, however, but certain of various ways in which the principle of the invention may be used.

The exothermic reaction mixture of my invention will ordinarily be placed within a graphite crucible having a sprue opening in its bottom (see Cadwell Patent 2,229,045 and Carlson Patent 2,277,014) and such crucible will be positioned above a mold adapted to form the cast weld juncture between the parts to be welded. When opposed cable ends are to be joined, the insulation may be stripped from the cable end portions about 1½" from such ends and the exposed cable ends may then be properly positioned in a graphite mold leaving a slight distance therebetween (usually about 1/16" to 1/8"). The cables may desirably be firmly clamped beyond the mold to ensure against accidental displacement during the welding operation. A thin metal disc which may be of steel, for example, and slightly dished is dropped into the crucible and positioned over the sprue opening. When such disc has been seated, a cartridge of exothermic reaction material of the general type disclosed in Cadwell Patent No. 2,229,045 may be inverted into the crucible with the ignition powder on top. When the starting powder has been ignited, as by means of a spark gun, the exothermic reaction which immediately takes place produces the desired charge of molten copper metal which promptly melts through the disc and drops down through the sprue into the mold cavity to produce the cast weld between the cable ends. A lower mold cavity may desirably also be provided when thus welding cable ends to permit the metal initially discharged from the crucible to preheat the cable end portions as it flows downwardly into such lower cavity.

In order that a cast weld connection of small size may have adequate physical strength and current-carrying capacity for difficult conditions of use, it is necessary that such small weld shall have improved grain structure and that it be thoroughly integrally joined with the individual conductor strands. To obtain such improved results, I modify the exothermic reaction mixture in the manner explained below.

I have found that if small amounts of certain nonferrous metals are incorporated in the exothermic reaction mixture in the proper manner to alloy with the molten copper produced thereby, the weld metal has an improved wetting effect on the metal parts with which it is intended to join, the molten weld metal may be produced at a somewhat lower temperature and therefore has less tendency to embrittle the strands of a cable or the like, and a very strong weld is obtained capable of withstanding rough handling in use. I have discovered, particularly, that a small amount of silver incorporated in the reaction mixture or otherwise introduced to alloy with the molten weld metal produces an especially beneficial effect. The following specific examples of suitable exothermic reaction materials for producing weld metal in accordance with my invention are set forth for purposes of illustration only, and it will be understood that a variety of other formulations may be utilized instead, as explained below:

*Example I*

| | Parts by weight |
|---|---|
| Copper scale (roasted) | 71.83 |
| Copper aluminum alloy, crushed (57% copper, 43% aluminum) | 20.41 |
| Calcium silicon | 2.04 |
| Fluorspar | 2.04 |
| Zinc oxide | .68 |
| Silver | 3.00 |
| | 100.00 |

*Example II*

| | Parts by weight |
|---|---|
| Copper scale (roasted) | 73.69 |
| Copper aluminum alloy, crushed (50% copper, 50% aluminum) | 18.48 |
| Calcium silicon | 2.07 |
| Fluorspar | 2.07 |
| Zinc oxide | .69 |
| Silver | 3.00 |
| | 100.00 |

*Example III*

| | Parts by weight |
|---|---|
| Copper scale (roasted) | 71.45 |
| Copper aluminum alloy, crushed (57% copper, 43% aluminum) | 20.30 |
| Calcium silicon | 2.03 |
| Fluorspar | 2.03 |
| Zinc oxide | .68 |
| Phosphorus-copper alloy (85% copper, 15% phosphorus) | 3.51 |
| | 100.00 |

*Example IV*

| | Parts by weight |
|---|---|
| Copper scale (roasted) | 73.30 |
| Copper aluminum alloy, crushed (50% copper, 50% aluminum) | 18.38 |
| Calcium silicon | 2.06 |
| Fluorspar | 2.06 |
| Zinc oxide | .69 |
| Phosphorus-copper alloy (85% copper, 15% phosphorus) | 3.51 |
| | 100.00 |

In producing the improved exothermic reaction mixtures of this invention, I utilize a reaction mixture such as that taught in Cadwell Patent 2,229,045, adding a small amount, ordinarily from about 2 to 8% of the alloying metal thereto, or preferably substituting such alloying metal for an equivalent amount of the copper present as metal in the reaction mixture. Thus, the basic reaction mixture will ordinarily comprise from about 30 to about 90 parts by weight of copper oxide (roasted copper mill scale) and from about 14 to about 30 parts by weight of copper aluminum alloy, the latter comprising from about 30 to 70% copper and from about 70 to about 30% aluminum, the usual preferred composition being about 57% copper and about 43% aluminum. A specific preferred example of such copper producing exothermic reaction material may be given as follows:

| | Parts by weight |
|---|---|
| Copper scale (roasted) | 74.05 |
| Copper aluminum alloy (57% copper, 43% aluminum) | 21.05 |
| Calcium silicon | 2.10 |
| Fluorspar | 2.10 |
| Zinc oxide | .70 |
| | 100.00 |

When alloying metal such as silver is added, the copper and aluminum will ordinarily each comprise about 50% of the copper aluminum alloy (see Example II above, which is a preferred embodiment of this invention).

The small amounts of calcium silicon, fluorspar and zinc oxide included in the several foregoing mixtures afford a desirable fluxing action and enhance the soundness of the weld metal. When a thin steel disk is utilized to close the sprue opening of the crucible, the metal therefrom will likewise be incorporated in the weld metal when it is melted by the heat of the exothermic reaction but inasmuch as such disk is ordinarily extremely thin, the amount of iron added thereby is usually inconsequential.

The copper producing exothermic reaction mixture last listed above may be modified by substituting for a portion of the copper present as metal a generally equivalent amount of silver, phosphorus, zinc, tin, or aluminum in amounts ranging from about 2 to about 8% of the total weight of the reaction mixture. Thus, the amount of copper in the copper-aluminum alloy may be reduced somewhat so that the heat of the molten metal produced by the exothermic reaction mixture would be rather greater than desired if it were not for the presence of the alloying metal intermixed therewith. With the exception of phosphorus and zinc, the indicated alloying metals may be dispersed through the reaction mixture in granular or finely divided form, but it is generally preferred that they be incorporated in that part of the mixture lying in the lower part of the crucible and this is quite important in the case of materials such as phosphorus and zinc having relatively low boiling points. This may be done in the case of silver, for example, by silver-plating the sprue closure disk or even forming such disk of a very thin sheet of silver. The zinc, tin and aluminum may be similarly employed. The phosphorus may desirably be incorporated in the form of a phosphorus-copper alloy as indicated above. Such alloy is very brittle and may simply be provided in the form of small lumps in the bottom of the crucible or bonded together with water glass (sodium silicate), for example, to form the sprue closure disk. In general, any non-ferrous alloying ingredient which it is desired to employ in the copper producing exothermic reaction mixture and which has a relatively low boiling point (i. e. below about 3500° F.) should be placed at or near the bottom of the crucible inasmuch as the exothermic reaction between the aluminum and the copper oxide, even though modified by the presence of copper as metal in the amounts indicated, is sufficient to generate a momentary localized temperature on the order of 4000° F. Silver which has a boiling point of 3634° F. may be dispersed throughout the reaction mixture with satisfactory results although it may be preferred to concentrate the silver in the lower part of the crucible where the heat is not as intense. With alloying elements boiling below about 3000° F. it becomes very desirable to place the same in the lower part of the crucible and with those boiling below 2500° F. it is most important.

Utilizing a copper producing exothermic reaction mixture conforming to the formulation last given above but with 3½% silver filings incorporated in the mixture, a cast weld was produced which upon analysis had the following composition:

| | Percent |
|---|---|
| Copper | 93.45 |
| Aluminum | 1.69 |
| Silicon | .40 |
| Iron (from sprue closure disk) | .95 |
| Silver | 3.35 |
| | [1] 99.84 |

[1] .16% unaccounted for.

The cast weld having the composition above given was physically strong and not brittle under impact. The weld metal was employed to splice together two ½ inch diameter copper bus bars, and it was found that a weld of no greater diameter than the bars had excellent current-carrying capacity and excellent strength under all conditions of use.

When the alloying metal has a boiling point on the order of 2500° F. or less (e. g. zinc), it is very important that it be placed in the bottom of the crucible to avoid substantial volatilization by the heat of the reaction. Alloying metals may sometimes be provided in the form of their oxides and substituted for a portion of the roasted copper scale (largely $Cu_2O$), but only when their boiling points are sufficiently high to avoid volatilization by the intense heat of the reaction. It is difficult to control such reactions, however, wherein other metal oxides take part and it is ordinarily preferred to incorporate the alloying material as metal in finely divided form (such as small filings) throughout the mixture or, if of low boiling point, in the lower portion of the crucible.

Various copper alloys or solders are well known in the brazing art, one of the best known being "silver solder" which contains from about 30% to about 50% silver by weight, and sometimes as much as 72%, the balance being copper, with sometimes some zinc. Such solder is, of course, very expensive but may be used in small quantities due to its great wetting ability. Although very weak itself it is nevertheless capable of forming a strong butt joint between two parts if in a sufficiently thin film, on the order of about .004 inch or slightly more. In contrast thereto, I have found that if silver is incorporated in a copper-producing exothermic reaction mixture of the type indicated in an amount to yield a copper-silver alloy containing only from about ½% to about 10% silver by weight (the balance being substantially all copper) such alloy not only has greatly enhanced wetting properties whereby an improved weld may be made with stranded copper conductors, bus bars, steel rail heads, and the like, but also a most unexpectedly improved mechanical strength. Cast welds of such material will withstand heavy shocks and blows to a surprising degree even when the cast weld metal is of a thickness far exceeding that at which silver solder can effectively be utilized. I prefer to employ from about 1½% to about 8% silver by weight in the cast weld metal alloyed with the copper, and ordinarily from 3% to 5% silver is most effective for my purpose.

Nickel may be substituted for a portion of the silver indicated above with good results and a considerable saving in cost. If the nickel largely or completely replaces the silver, however, the effect is less satisfactory although still an improvement over the unalloyed copper as produced from the exothermic reaction material of Cadwell Patent 2,229,045. I am aware that it has been proposed in the past to alloy nickel with copper weld metal, but only in much larger proportions of at least 15% and usually much more. My weld metal by contrast, may comprise about 2% silver and about 2% nickel, for example, with the balance copper, and even when the nickel is employed alone with the copper it will not exceed about 7% by weight.

Utilizing the principles of my invention I am enabled to produce sound welds of copper metal alloyed with small amounts of other elements to improve the physical characteristics of the weld despite the fact that the amount of weld metal produced may be so small as to have but a small reservoir of heat to effect the weld. Large amounts of phosphorous or nickel, for example, reduce the electrical conductivity of the welded connection. Most of the phosphorous (which has a desirable de-oxidizing action) is driven off by the heat of the reaction, preferably leaving only about .1% to .5% by weight in the final weld, with .2% usually best. About .25% to about 1% and ordinarily about .53% phosphorus should be present in the bottom of the crucible to achieve this result.

With small welds, such as those joining copper cable ends and bus bars, it is important to preheat the surfaces to be welded. Otherwise such surfaces will so cool the weld metal due to their high conductivity that only a partial weld will be obtained, if indeed any. The alloying materials specifically mentioned enhance the wetting ability of the molten copper and also improve the strength of the finished weld. Good electrical conductivity may moreover be maintained. This application discloses but does not claim certain subject-matter disclosed and claimed in my divisional application Serial No. 422,032, "Welding Apparatus," filed April 9, 1954.

Other modes of applying the principle of the invention may be employed, change being made as regards the details described, provided the features stated in any of the following claims or the equivalent of such be employed.

I therefore particularly point out and distinctly claim as my invention:

1. An exothermic reaction mixture for producing a molten copper alloy comprising approximately

|  | Parts by weight |
|---|---|
| Copper scale (roasted) | 71.83 |
| Copper aluminum alloy, crushed (57% copper, 43% aluminum) | 20.41 |
| Calcium silicon | 2.04 |
| Fluorspar | 2.04 |
| Zinc oxide | .68 |
| Silver | 3.00 |

2. An exothermic reaction mixture for producing a molten copper alloy comprising approximately

|  | Parts by weight |
|---|---|
| Copper scale (roasted) | 73.69 |
| Copper aluminum alloy, crushed 50% copper, 50% aluminum) | 18.48 |
| Calcium silicon | 2.07 |
| Fluorspar | 2.07 |
| Zinc oxide | .69 |
| Silver | 3.00 |

3. An exothermic reaction mixture for producing a molten copper alloy comprising approximately

|  | Parts by weight |
|---|---|
| Copper scale (roasted) | 71.45 |
| Copper aluminum alloy, crushed (57% copper, 43% aluminum) | 20.30 |
| Calcium silicon | 2.03 |
| Fluorspar | 2.03 |
| Zinc oxide | .68 |
| Phosphorus-copper alloy (85% copper, 15% phosphorus) | 3.51 |

4. An exothermic reaction mixture for producing a molten copper alloy comprising approximately

|  | Parts by weight |
|---|---|
| Copper scale (roasted) | 73.30 |
| Copper aluminum alloy, crushed (50% copper, 50% aluminum) | 18.38 |
| Calcium silicon | 2.06 |
| Fluorspar | 2.06 |
| Zinc oxide | .69 |
| Phosphorus-copper alloy (85% copper, 15% phosphorus) | 3.51 |

5. An exothermic reaction mixture for producing a molten copper alloy comprising from about 30 to about 90 parts by weight of copper oxide; from about 14 to about 30 parts by weight of copper aluminum alloy, the latter comprising from about 30 to 70% copper and from 70 to 30% aluminum by weight; and from about ½ to about 10 parts of silver by weight.

6. An exothermic reaction mixture for producing a molten copper alloy comprising from about 30 to about 90 parts by weight of copper oxide; from about 14 to about 30 parts by weight of copper aluminum alloy, the latter comprising from about 30 to 70% copper and from 70 to 30% aluminum by weight; and from about .25% to about .53% of phosphorus by weight.

References Cited in the file of this patent

UNITED STATES PATENTS

| | | |
|---|---|---|
| 337,562 | Cunningham | Mar. 9, 1886 |
| 1,272,700 | Newcomb | July 16, 1918 |
| 1,556,402 | Begtrup | Oct. 6, 1925 |
| 2,024,132 | Sander | Dec. 10, 1935 |
| 2,097,709 | Walters | Nov. 2, 1937 |
| 2,163,022 | Campbell | June 20, 1939 |
| 2,185,464 | Howell | Jan. 2, 1940 |
| 2,229,045 | Cadwell | Jan. 21, 1941 |
| 2,262,755 | Cadwell | Nov. 18, 1941 |
| 2,277,014 | Carlson | Mar. 17, 1942 |
| 2,427,727 | Huntley et al. | Sept. 23, 1947 |
| 2,482,093 | Carlson | Sept. 20, 1949 |
| 2,576,528 | Matthysse | Nov. 27, 1951 |